US009400187B2

(12) United States Patent
Lee

(10) Patent No.: US 9,400,187 B2
(45) Date of Patent: Jul. 26, 2016

(54) AUTONOMOUS DRIVING VEHICLE, AUTONOMOUS DRIVING MANAGEMENT APPARATUS, AND METHOD OF CONTROLLING THE SAME

(71) Applicant: Hyundai Mobis Co., Ltd., Seoul (KR)

(72) Inventor: Joo Yeob Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/796,486

(22) Filed: Jul. 10, 2015

(65) Prior Publication Data

US 2016/0131494 A1    May 12, 2016

(30) Foreign Application Priority Data

Nov. 10, 2014  (KR) .................. 10-2014-0155540

(51) Int. Cl.
| | | |
|---|---|---|
| G01C 22/00 | (2006.01) | |
| G01C 21/36 | (2006.01) | |
| B60W 30/14 | (2006.01) | |
| H04B 7/185 | (2006.01) | |
| H04W 24/04 | (2009.01) | |

(52) U.S. Cl.
CPC .......... *G01C 21/3605* (2013.01); *B60W 30/14* (2013.01); *H04B 7/18506* (2013.01); *H04W 24/04* (2013.01)

(58) Field of Classification Search
None
See application file for complete search history.

(56) References Cited

U.S. PATENT DOCUMENTS

2008/0177994 A1* 7/2008 Mayer ................ G06F 9/4418
                                                                                713/2
2015/0077326 A1* 3/2015 Kramer ............... G06F 3/0325
                                                                                345/156

* cited by examiner

*Primary Examiner* — Adam Alharbi
(74) *Attorney, Agent, or Firm* — H.C. Park & Associates, PLC

(57) ABSTRACT

An autonomous driving vehicle, an autonomous driving management apparatus, and a method of controlling the same. The autonomous driving vehicle includes: a wireless communication unit configured to receive position information about the vehicle; a storage unit configured to store an electronic map; an input unit configured to receive a destination; a driving unit configured to adjust a travelling speed and a travelling direction; and a controller configured to search for a path from a point corresponding to the position information to a point corresponding to the destination in the electronic map, and control the vehicle to travel the approved section through the driving unit when receiving an approval of an occupation right for one or more sections included in the path through the wireless communication unit.

15 Claims, 16 Drawing Sheets

AUTONOMOUS DRIVING VEHICLE, AUTONOMOUS DRIVING MANAGEMENT APPARATUS, AND METHOD OF CONTROLLING THE SAME

CROSS-REFERENCE TO RELATED APPLICATION

This application claims priority from and the benefit of Korean Patent Application Number 10-2014-0155540, filed Nov. 10, 2014, which is hereby incorporated by reference for all purposes as if fully set forth herein.

BACKGROUND

1. Field

Exemplary embodiments relate to an autonomous driving vehicle, an autonomous driving management apparatus, and a method of controlling the same, and more particularly, to an autonomous driving vehicle, an autonomous driving management apparatus, and a method of controlling the same, which decrease a possibility for accidents.

2. Discussion of the Background

Today, the vehicle industry has progressed to the point of implementing autonomous driving that minimizes the need for intervention by a driver.

An autonomous driving vehicle refers to a vehicle, which has an external information detection and processing function while travelling and recognizes a surrounding environment to self-determine a travelling path, and independently travels by using power thereof.

The autonomous driving vehicle may maintain a distance from an obstacle existing on a path and adjust a speed and a travelling direction according to a shape of a road to find a destination by itself without operation of a steering wheel, an acceleration pedal, or a brake by a driver in the vehicle. For example, the autonomous driving vehicle may perform acceleration on a straight road, and perform deceleration while changing a travelling direction in accordance with a curvature of a road on a curved road.

In this case, in order to search for a path from a predetermined place to another place and travel a searched path, the autonomous driving vehicle may use sensors (for example, a camera and a radar) for detecting objects around the path, a global positioning system (GPS) receiver, electronic maps, and the like.

That is, in order to implement the autonomous driving vehicle, it is required to graft various electronic devices onto IT technology, such as an electronic sensor unit for measuring a travelling environment of a vehicle together with a general vehicle system, technology for effectively processing data autonomously generated or received from the outside, and communication technology between vehicles or between a vehicle and an infrastructure. In this respect, business operators of a non-vehicle industry, such as a software manufacturing company or a robot manufacturing company, as well as a typical vehicle manufacturing company, have rushed into a technical field related to the autonomous driving vehicle.

In order to guarantee stable travelling of the autonomous driving vehicle, three core processes are required. First, a driving environment is measured through a sensor unit mounted in a vehicle. Second, a travelling state of the vehicle is continuously monitored and controlled in accordance with the measured travelling environment. Third, path departure or a collision situation with an obstacle is prevented by using communication technology between vehicles or the vehicle and infrastructures.

The currently developed autonomous driving vehicle has focused to the first and second mentioned processes, but if the third process is not guaranteed to happen without fail, it is impossible to completely secure safety of the autonomous driving vehicle itself and safety of another vehicle or a person.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an autonomous driving vehicle, an autonomous driving management apparatus, and a method of controlling the same, which are capable of maintaining a distance from another vehicle to prevent a collision accident by requesting and receiving an approval of an exclusive occupation right to a specific region on a travelling path for a predetermined time.

Additional aspects will be set forth in the detailed description which follows, and, in part, will be apparent from the disclosure, or may be learned by practice of the inventive concept.

An exemplary embodiment discloses an autonomous driving vehicle including: a wireless communication unit configured to receive position information about the vehicle; a storage unit configured to store an electronic map; an input unit configured to receive a destination; a driving unit configured to adjust a travelling speed and a travelling direction; and a controller configured to search for a path from a point corresponding to the position information to a point corresponding to the destination in the electronic map, and control the vehicle to travel an approved section by the driving unit when receiving an approval of an occupation right for one or more sections included in the path through the wireless communication unit.

An exemplary embodiment also discloses an autonomous driving management apparatus including: a storage unit configured to store an electronic map including a plurality of sections including different identifications (IDs); a wireless communication unit configured to receive from a vehicle an occupation right setting request for one or more of the sections; and a controller configured to obtain an identification (ID) of a section corresponding to the occupation right setting request, and approve or reject the occupation right setting request for the section having the identification (ID) of the section based on a pre-defined rule.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
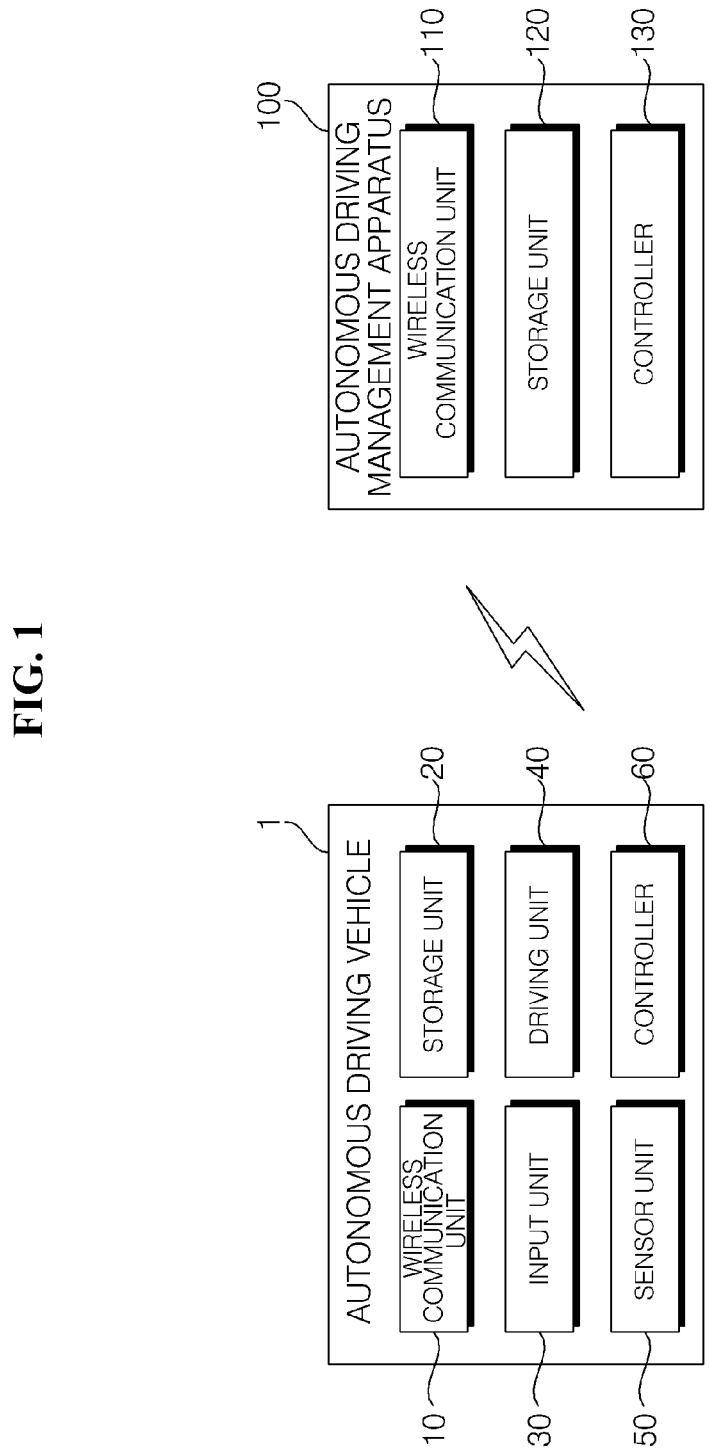
FIG. 1 is a block diagram for describing an autonomous driving vehicle and an autonomous driving management apparatus according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

FIG. 1 is a block diagram for describing an autonomous driving vehicle 1 and an autonomous driving management apparatus 100 according to an exemplary embodiment of the present invention.

First, referring to FIG. 1, the autonomous driving vehicle 1 may include a wireless communication unit 10, a storage unit 20, an input unit 30, a driving unit 40, a sensor unit 50, an output unit (not illustrated), a controller 60, and the like. The constituent elements illustrated in FIG. 1 are not essential to implement the autonomous driving vehicle 1, so that the autonomous driving vehicle 1 may include more or fewer elements than the constituent elements illustrated in FIG. 1.

Particularly, the wireless communication unit 10 may include one or more modules, which are capable of establishing wireless communication between the autonomous driving vehicle 1 and a wireless communication system, or between the autonomous driving vehicle 1 and another autonomous driving vehicle, or between the autonomous driving vehicle 1 and an external server. Further, the wireless communication unit 10 may include one or more modules for connecting the autonomous driving vehicle 1 to one or more networks. For example, the wireless communication unit 10 may include a global positioning system (GPS) module, and the GPS module may obtain position information about the autonomous driving vehicle 1 by using a signal transmitted from a GPS satellite.

The storage unit 20 may store a program for an operation of the controller 60, and also temporarily store input/output data. Further, various information (for example, an electronic map) necessary for travelling of the autonomous driving vehicle 1 may be stored in the storage unit 20 in advance. Further, an identification (ID) of the autonomous driving vehicle 1 may be stored in the storage unit 20 in advance. Further, an ID of each of a plurality of sections included in an electronic map may be included in the storage unit 20. The ID of each section is differently assigned, so that the ID may be utilized for determining a position on a path of the autonomous driving vehicle 1, a distance from another vehicle 1, whether to approve an occupation right, which is to be described below, and the like.

The input unit 30 may include a camera for inputting an image signal, a microphone for inputting an audio signal, a user input unit 30 (for example, a touch key and a push key) for receiving information from a user, an interface module connected with an external storage medium (for example, a compact disk (CD) and a universal serial bus (USB)) to receive data recorded in the external storage medium, and the like.

The sensor unit 50 may include one or more sensors for measuring a travelling environment (for example, a pedestrian and weather) of the autonomous driving vehicle 1. For example, the sensor unit 50 may include a proximity sensor, a luminance sensor, an infrared sensor, an ultrasonic sensor, an optical sensor (for example, a camera), or an environment sensor (for example, a barometer, a hygrometer, a thermometer, a heat sensing sensor, and a gas sensing sensor). In the meantime, information sensed by two or more sensors among the sensors may be combined and utilized.

The output unit generates an output related to a visual sense, an auditory sense, a tactile sensor, and the like, and may include at least one of a display module, a sound module, a haptic module, and an optical output module (for example, a headlight).

The driving unit 40 adjusts acceleration, deceleration, steering, braking, and the like of the autonomous driving vehicle 1. The driving unit 40 may include a power module, a gear shift module, a steering module, a brake module, or the like. The power module (for example, an engine and a motor) receives an energy source and generates power necessary for driving. The gear shift module adjusts the amount of energy source (for example, fuel and electricity) transmitted to the power module to increase or decrease a speed of the autonomous driving vehicle 1. The steering module changes a steering angle of a wheel of the autonomous driving vehicle 1. The brake module may decelerate or stop the autonomous driving vehicle 1 or maintain a parking state separately from the gear shift module, and for example, the brake module may generate frictional force to the wheel to consume kinetic energy according to driving.

The controller 60 controls a general operation of the autonomous driving vehicle 1 in addition to the operation related to the program stored in the storage unit 20. The controller 60 processes a signal, data, information, and the like input or output through the previously-described constituent elements or drives a program stored in the memory to control the autonomous driving vehicle 1 to travel a predetermined path while the autonomous driving vehicle 1 performs acceleration, deceleration, braking, and the like.

Referring to FIG. 1, the autonomous driving management apparatus 100 may include a wireless communication unit 110, a storage unit 120, a controller 130, and the like. Each of the wireless communication unit 110, the storage unit 120, and the controller 130 included in the autonomous driving management apparatus 100 performs a similar function of that of the wireless communication unit 10, the storage unit 20, and the controller 60 of the autonomous driving vehicle 1, so that a detailed description thereof will be omitted. In the meantime, an electronic map stored in the storage unit 120 may be the same as the electronic map stored in the storage unit 20 of the autonomous driving vehicle 1, or be different from the electronic map stored in the storage unit 20 of the autonomous driving vehicle 1 in view of a scale, a compression rate, a driving program, and the like.

Figure 2:
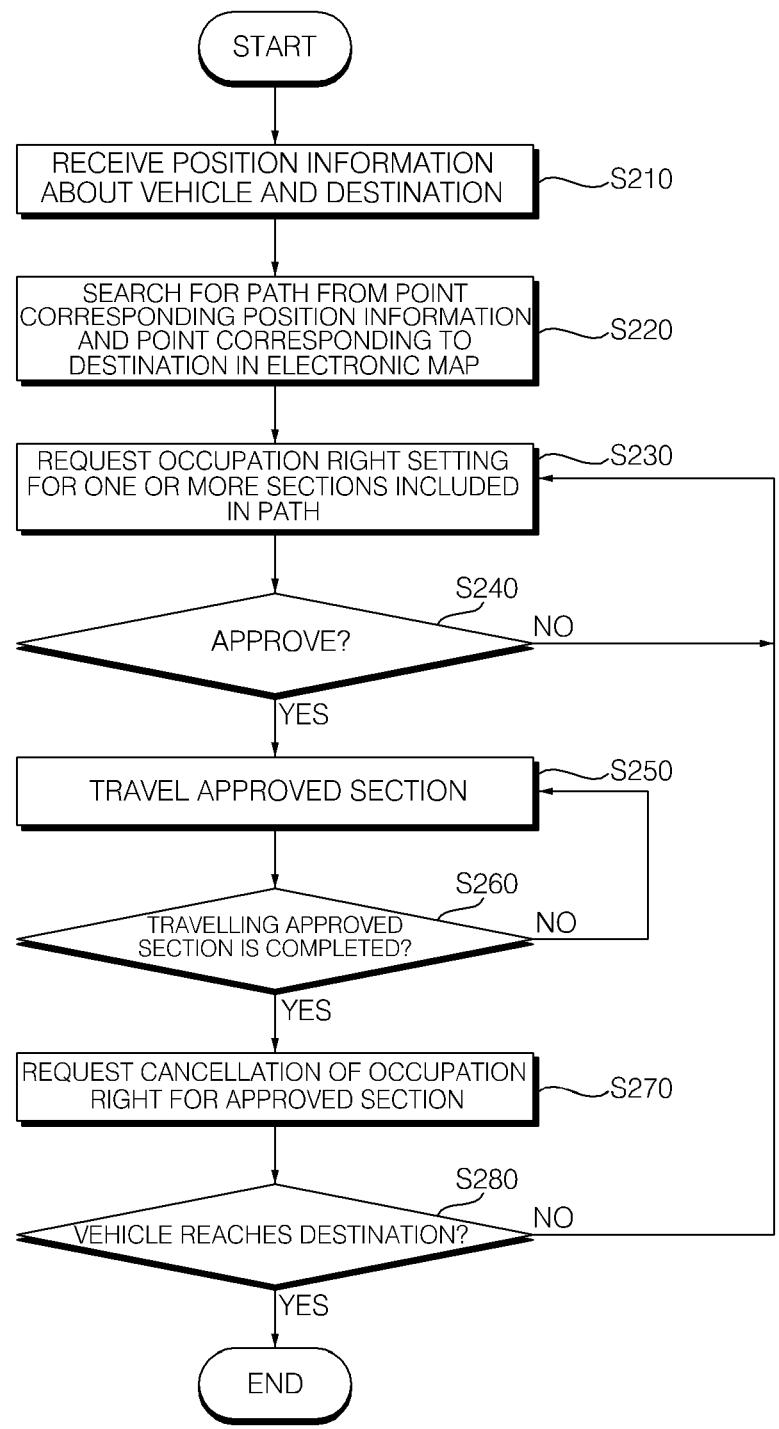
FIG. 2 is a flowchart for a method of controlling an autonomous driving vehicle according to an exemplary embodiment.

FIG. 2 is a flowchart for a method of controlling the autonomous driving vehicle (hereinafter, referred to as the "vehicle") according to an exemplary embodiment.

Referring to FIG. 2, the autonomous driving vehicle 1 receives position information about the vehicle 1 and a destination (S210). The position information may be received through the wireless communication unit 10 (for example, a GPS module), and the destination may be received from a user through the input unit 30 or the wireless communication unit 10.

Next, the controller 60 searches for a path from a point corresponding to the position information to a point corresponding to the destination in the electronic map (S220). In particular, the controller 60 accesses the electronic map stored in the storage unit 20, extracts points corresponding to the position information received in operation S210 and the destination information received in operation S210, and searches for a path between the two extracted points. Information about a plurality of sections may be included in the electronic map, and may include, for example, information about a direction for each section, a speed limit, a speed bump, a crossroad, a crosswalk, a toll gate, a sharp curve, a road state, an inclination angle, a connection with another section, information about neighboring areas (for example, a store and a gas station), an address, an accident record, and the like.

The electronic map stored in the storage unit 20 may be an electronic map received through the wireless communication unit or read from an external storage medium and the like through an interface module and the like.

The storage unit 20 may further include information about an ID pre-allocated to each of the plurality of sections included in the electronic map. That is, different IDs may be allocated to one section and another section, respectively.

Next, the controller 60 transmits an occupation right setting request for one or more sections included in the searched path to the autonomous driving management apparatus 100 (hereinafter, referred to as the "management apparatus") (S230). The occupation right used in the exemplary embodiments means an exclusive driving right for excluding driving of another vehicle 1 for a predetermined section included in the path. That is, in a section for which an occupation right is approved for a specific vehicle 1, another vehicle 1 cannot travel before the occupation right is cancelled.

The controller 60 may insert information about an ID (for example, a car number and a vehicle identification number) of the vehicle 1, an ID of one or more sections for which an occupation right is desired to be approved, a transmission time of the occupation right setting request, a time length for which the occupation right is desired to be approved, and the like into the occupation right setting request. Further, the occupation right setting request may have a message form, and may further include a check packet containing information about whether data is damaged, a start packet notifying of a start of the occupation right setting request, and an end packet notifying of an end of the occupation right setting request. In this case, the ID of the vehicle or the ID of the section may have a form of any one of a number, a character, and a special symbol or a combination of two or more thereof.

In this case, the controller 60 may adjust a length of time for which the occupation right is desired to be approved in accordance with a travelling speed of the vehicle 1. For example, when the travelling speed becomes high, a length of time for which the occupation right is desired to be approved for a specific section may be decreased. The reason is that when the travelling speed is high, the vehicle may traverse the same section more quickly.

Next, it is determined whether the occupation right setting request is approved (S240). That is, the controller 60 determines whether the occupation right for the corresponding section is approved or rejected by receiving a response to the occupation right setting request from the management apparatus 100 through the wireless communication unit 10.

Then, when it is determined that the occupation right for the section corresponding to the occupation right setting request is approved, the vehicle 1 travels the approved section (S250). For example, when the occupation right for a curved section is approved while the vehicle 1 travels a straight section, the controller 60 may decelerate the vehicle 1 through the gear shift module and adjust a steering angle of the wheel according to the curved section through the steering module.

In this case, the controller 60 may make the vehicle travel the approved section through the driving unit 40 by referring to information about a surrounding environment measured by the sensor unit 50. For example, even though the occupation right for the specific section is approved, when the sensor unit 50 measures an obstacle existing in the corresponding section, the controller 60 may stop the vehicle 1 through the driving unit 40, or transmit an occupation right setting request for another section and change a path.

In the meantime, when it is determined that the occupation right for the section corresponding to the occupation right setting request is rejected, the controller 60 may stop the vehicle 1 until the occupation right is approved, or receive an approval of an occupation right for another section.

Next, it is determined whether travelling the approved section is completed (S260).

Next, when it is determined that travelling the approved section is completed, a cancellation of the occupation right for the approved section is requested (S270). That is, the controller 60 returns the occupation right to the management apparatus 100 so that another vehicle may receive an approval of the occupation right for the path for which travelling is completed.

Next, it is determined whether the vehicle 1 reaches a destination of the searched path (S280). Particularly, when travelling the section including the destination or the section within a predetermined distance from the destination is completed, the controller 60 may determine that the vehicle 1 reaches the destination. In this case, the controller 60 may stop the vehicle 1 until a new path is searched.

Figure 3:
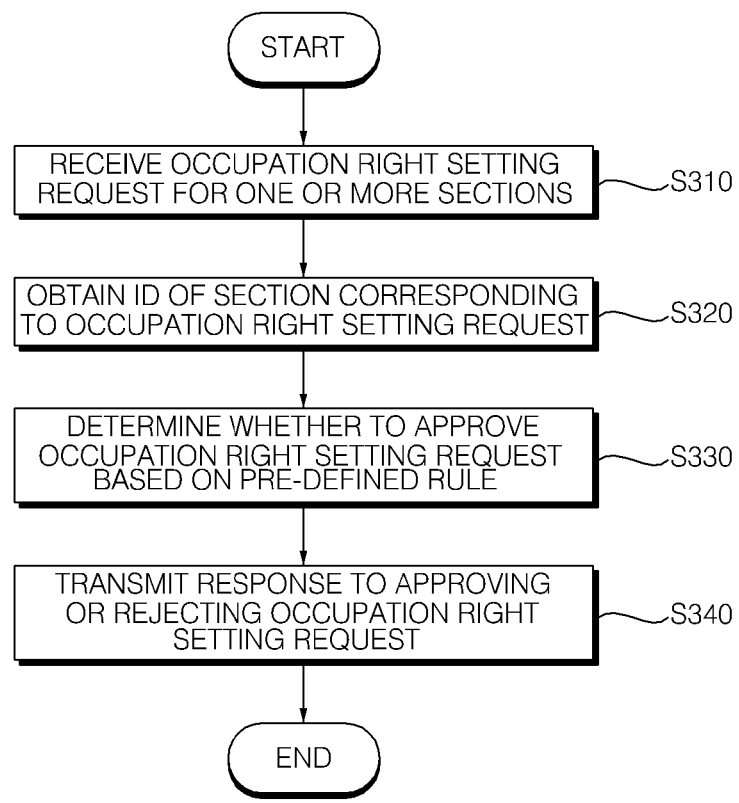
FIG. 3 is a flowchart for a method of controlling an autonomous driving management apparatus according to an exemplary embodiment.

FIG. 3 is a flowchart for a method of controlling the autonomous driving management apparatus 100 according to the exemplary embodiment of the present invention.

Referring to FIG. 3, the autonomous driving management apparatus 100 receives an occupation right setting request for one or more sections from the vehicle 1 through the wireless communication unit 110 (S310).

Then, the controller 130 obtains an ID of the section corresponding to the occupation right setting request (S320). Particularly, the controller 130 may extract an ID of the section included in the occupation right setting request received in S310, and confirm a section of the electronic map stored in the storage unit 120 for which the vehicle 1 desires to receive an approval of the occupation right.

Next, the controller 130 determines whether to approve the occupation right setting request for the section having the obtained ID based on a pre-defined rule (S330).

For example, a first rule for rejecting an occupation right setting request when an occupation right for a section corresponding to the occupation right setting request is already approved for another vehicle, and it may be pre-defined in the controller 130 or the storage unit 120.

In another example, a second rule for approving an occupation right for a corresponding section to a vehicle, which first transmits an occupation right setting request when a plurality of vehicles transmit the occupation right setting requests for the same section, and it may be pre-defined in the controller 130 or the storage unit 120.

In still another example, a third rule for approving an occupation right to a vehicle, which is located closest to the corresponding section when a plurality of vehicles transmit the occupation right setting requests for the same section, and it may be pre-defined in the controller 130 or the storage unit 120.

For still another example, a fourth rule for approving an occupation right for a corresponding section to a vehicle having a higher rating when a plurality of vehicles transmit the occupation right setting requests for the same section, and it may be pre-defined in the controller 130 or the storage unit 120. To this end, an ID and a rating for each vehicle 1 may be pre-stored in the storage unit 120. The rating for each vehicle may be classified by various references, such as the type of vehicle (for example, an ambulance, a bus, a general four-wheel vehicle, and a two-wheel vehicle), and a priority between respective ratings may be assigned. The controller 130 may obtain a vehicle ID included in the occupation right setting request and confirm a rating corresponding to each vehicle 1.

For still another example, a fifth rule for approving an occupation right only to a vehicle 1 transmitting an occupation right setting request for a section which is only allowable to the vehicle 1, and it may be pre-defined in the controller 130 or the storage unit 120. To this end, a rating for each section may further pre-stored in the storage unit 120. The rating for each section may be classified based on various references, such as the type of section (for example, an exclusive bus lane, an expressway, and a general road), and a priority between the ratings for respective sections may be assigned. For example, when it is determined that a two-wheeled vehicle which is not allowed on an expressway requests the occupation right for the expressway, the controller 130 may reject the occupation right setting request of the two-wheeled vehicle based on the vehicle ID and the section ID included in the request.

In the meantime, the controller 130 may approve an occupation right for one or more sections, which are different from the rejected section, to the vehicle 1 of which the occupation right setting request for the predetermined section is rejected.

The first to fifth rules mentioned above are simply illustrative, and more or fewer rules may be pre-defined as a matter of course. Further, when the rules are pre-stored, a priority between the respective rules may be defined together. Further, it should be understood that the reference for classifying the rating for each vehicle 1 or the rating for each section may be changed according to a road environment and the like.

Then, the controller 130 may transmit a response of approving or rejecting the occupation right setting request to the vehicle 1 through the wireless communication unit (S340). Accordingly, the vehicle 1 may travel the approved section or stop until the occupation right for the rejected section or a new section is approved.

Next, when the controller 130 receives an occupation right cancellation request from the vehicle 1 through the wireless communication unit 110, the controller 130 may cancel the occupation right approved for the section corresponding to the occupation right cancellation request. Particularly, the vehicle 1, which receives the approval of the occupation right for the predetermined section and completes travelling the corresponding section, transmits the occupation right cancellation request, and the controller 130 may cancel the occupation right of the section corresponding to the occupation right cancellation request and change a current state of the vehicle 1 to a state in which another vehicle 1 may receive an approval of the occupation right for the corresponding section.

Hereinafter, examples in which the vehicle 1 travels a path to a destination according to the exemplary embodiment of the present invention will be described with reference to FIGS. 4A to 9C. Referring to FIGS. 4A to 9C, the electronic map may include a plurality of sections, and different IDs may be assigned to the sections, respectively. Hereinafter, the ID of each section is assumed to have a form of [X-X-X].

The sections having the same size and shape are illustrated in FIGS. 4A to 9C, but are simply illustrative, and the sections may have different sizes or shapes.

Figure 4A:
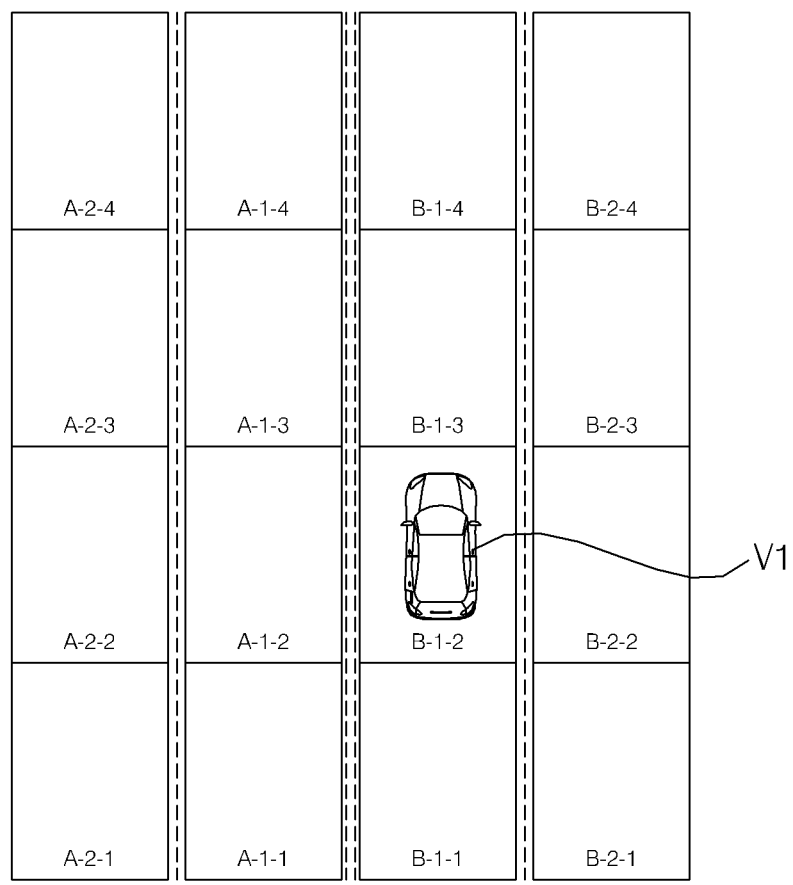
FIGS. 4A and 4B are an example in which the autonomous driving vehicle travels a path according to an exemplary embodiment.
Figure 4B:
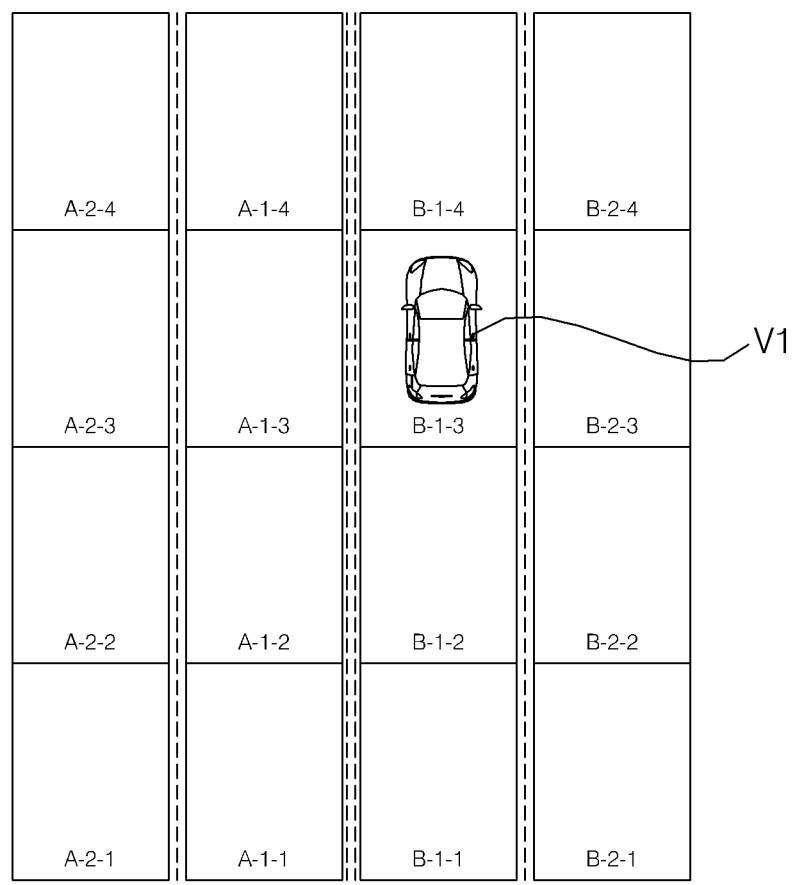

FIGS. 4A and 4B are an example in which the autonomous driving vehicle 1 travels a path according to the exemplary embodiment.

Referring to FIG. 4A, a four-lane road is exemplified, and it is assumed that left two lanes are down-line lanes [A-X-X] and right two lanes are up-line lanes [B-X-X]. A first vehicle V1 travelling a section [B-1-2] may transmit an occupation right setting request for a section [B-1-3] to the management apparatus 100.

In this case, a vehicle other than the first vehicle V1 does not exist in the up-line lane, the management apparatus 100 may approve the occupation right for the section [B-1-3] corresponding to the occupation right setting request of the first vehicle V1.

When the first vehicle V1 receives a response of the management apparatus 100 approving the occupation right setting request, the first vehicle V1 may travel from the [B-1-2] to the section [B-1-3] as illustrated in FIG. 4B.

Although not illustrated, when the first vehicle V1 completes the travelling of the section [B-1-3] for which the occupation right is approved, the first vehicle V1 may continuously travel the path while receiving an occupation right for at least one section among other sections (for example, a section [B-1-4], a section [B-2-3], and a section [B-2-4]).

In the meantime, the first vehicle V1 transmits the occupation right setting request for the section [B-1-3] just adjacent to the section [B-1-2], but may simultaneously transmit the occupation right setting requests for the plurality of connected sections (for example, the section [B-1-3], a section [B-1-4], and a section [B-2-4]).

Figure 5A:
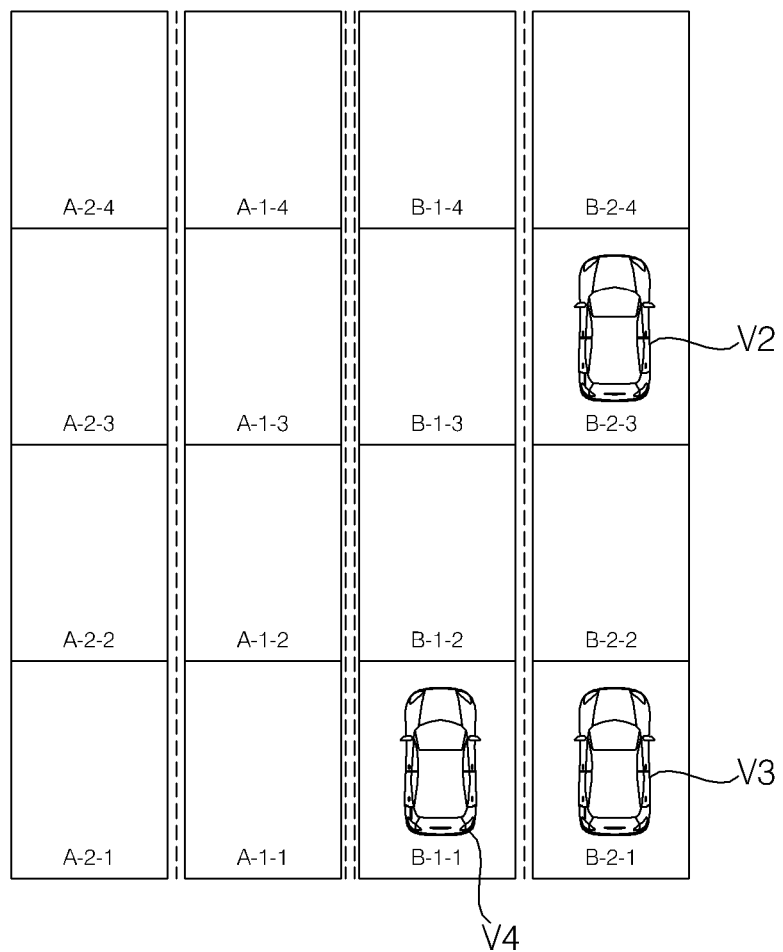
FIGS. 5A and 5B are an example in which a plurality of autonomous driving vehicles travel a path according to an exemplary embodiment.
Figure 5B:
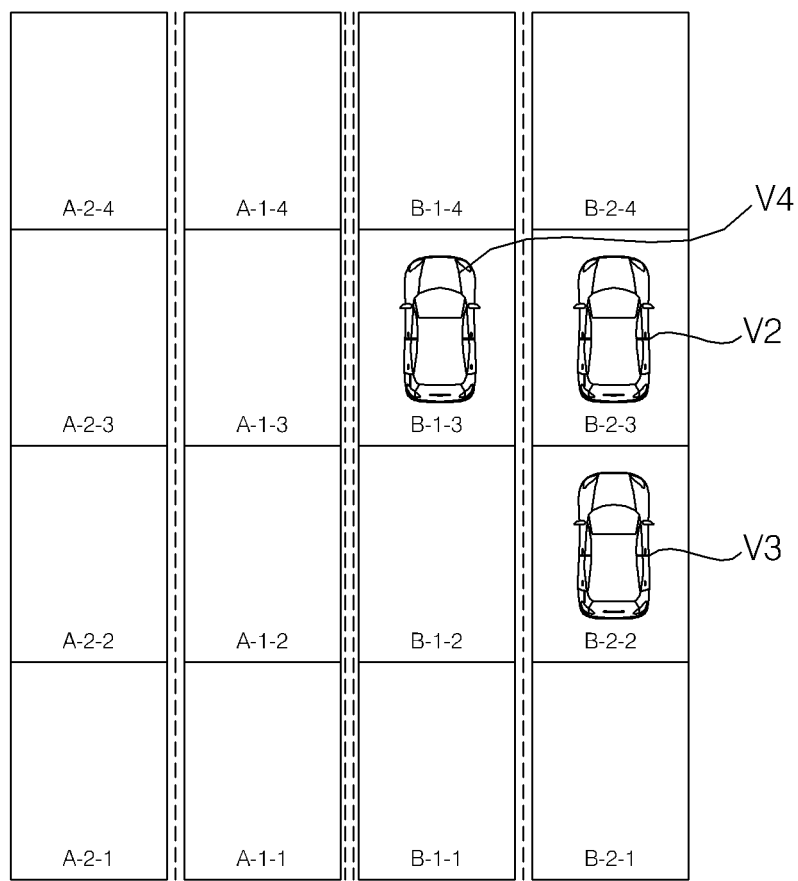

FIGS. 5A and 5B are an example in which a plurality of autonomous driving vehicles travels a path according to the exemplary embodiment.

Referring to FIG. 5A, a second vehicle V2, a third vehicle V3, and a fourth vehicle V4 are travelling a section [B-2-3], a section [B-2-1], and [B-1-1] respectively.

In this case, it is assumed that the second vehicle V2 is in a stopped state at the section [B-2-3], and the third vehicle V3 transmits an occupation right setting request for the sections [B-2-2] and [B-2-3], and the fourth vehicle V4 transmits an occupation right setting request for the sections [B-1-2] and [B-1-3].

The management apparatus 100 determines that there exists no vehicle receiving the approval of the occupation right for the sections [B-1-2] and [B-1-3], and approves the occupation right for all of the sections [B-1-2] and [B-1-3] corresponding to the occupation right approval request of the fourth vehicle V4.

In the meantime, since the second vehicle V2 receiving the approval of the occupation right for the section [B-2-3] is in stopped state, the management apparatus 100 may approve the occupation right for the section [B-2-2] among the sections corresponding to the occupation right approval request of the third vehicle V3, and reject the occupation right for the section [B-2-3].

Accordingly, as illustrated in FIG. 5B, the fourth vehicle V4 may travel from the section [B-1-1] to the section [B-1-3] via the section [B-1-2], but the third vehicle V3 may travel only from the section [B-2-1] to the section [B-2-2].

Accordingly, a section of which an occupation right is approved to a specific vehicle is not approved to other vehicles, so that it is possible to prevent a collision between vehicles.

Figure 6A:
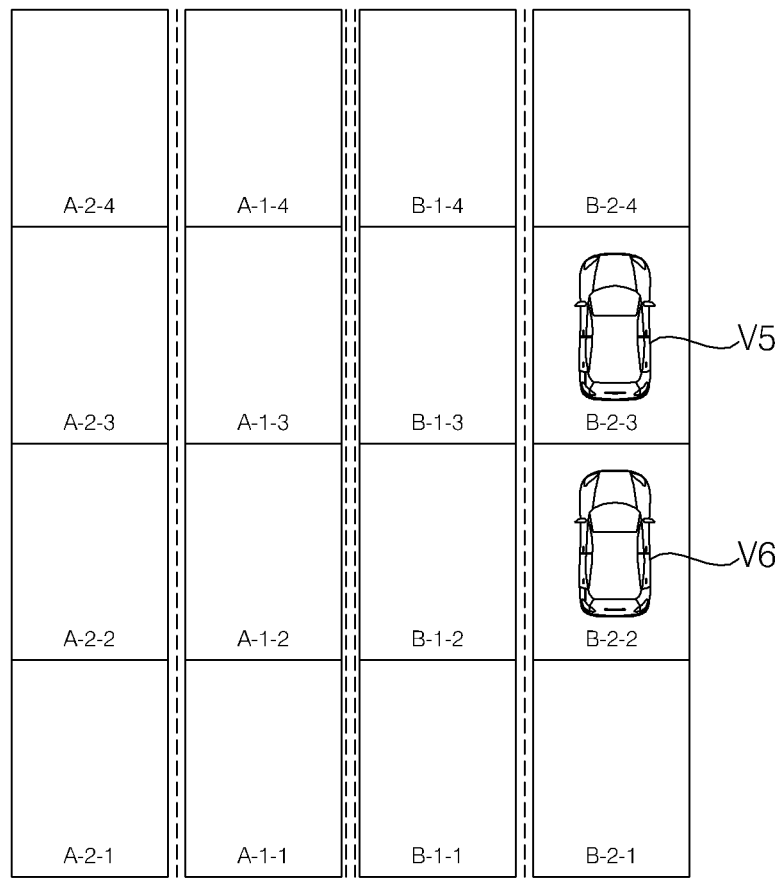
FIGS. 6A and 6B are another example in which a plurality of autonomous driving vehicles travel a path according to an exemplary embodiment.
Figure 6B:
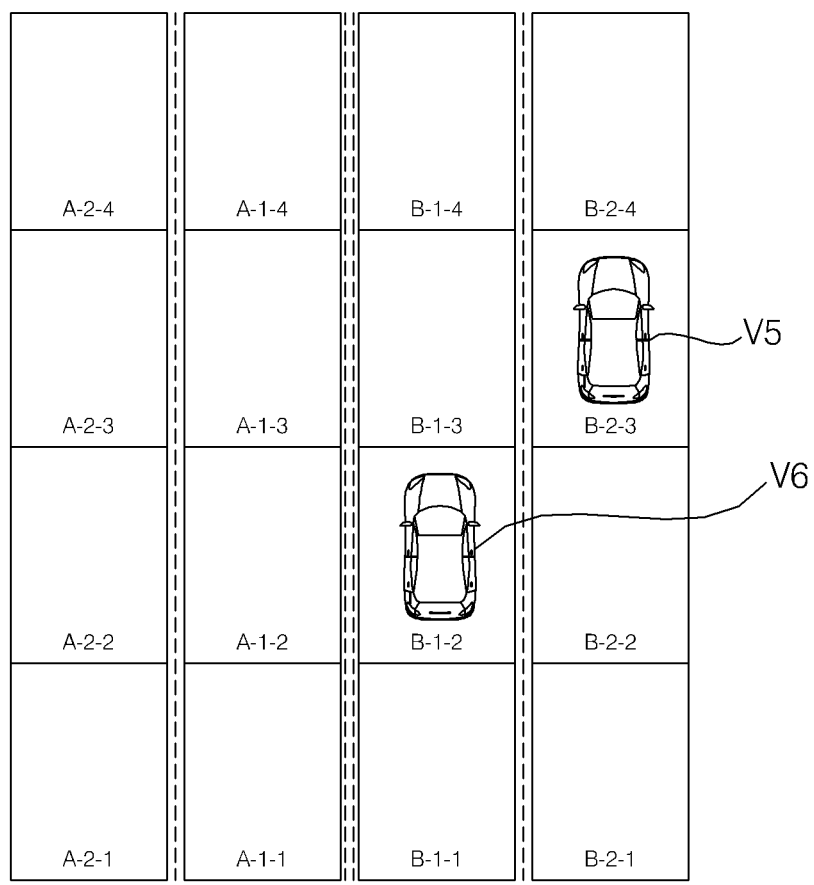

FIGS. 6A and 6B are another example in which a plurality of autonomous driving vehicles travels a path according to the exemplary embodiment.

Referring to FIG. 6A, a fifth vehicle V5 and a sixth vehicle V6 are travelling a section [B-2-3] and [B-2-2] respectively.

In this case, it is assumed that the fifth vehicle V5 is in stopped state in the section [B-2-3], and the sixth vehicle V6 transmits an occupation right setting request for the section [B-2-3] to the management apparatus 100.

Since the fifth vehicle V5 occupies the section [B-2-3], the management apparatus 100 may reject the occupation right approval request of the sixth vehicle V6 for the section [B-2-3], and approve an occupation right for one or more sections different from the section [B-2-3] to the sixth vehicle V6.

For example, the management apparatus 100 may approve the occupation right for the section [B-1-2] right adjacent to the section [B-2-2] to enable the sixth vehicle V6 to travel from the section [B-2-2] to the section [B-1-2], not the section [B-2-3], as illustrated in FIG. 6B.

Accordingly, it is possible to prevent a collision between the fifth vehicle V5 and the sixth vehicle V6, and the sixth vehicle V6 may continuously travel another path without standing by at the section [B-2-2] until the occupation right for the section [B-2-3], which is approved to the fifth vehicle V5, is cancelled.

Figure 7A:
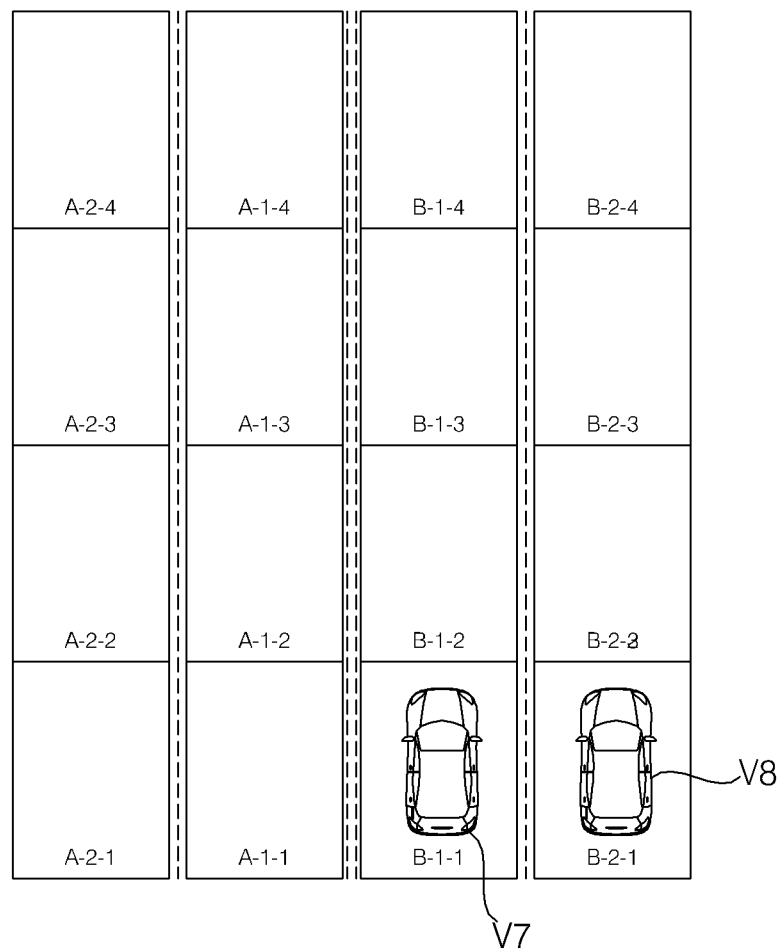
FIGS. 7A and 7B are another example in which a plurality of autonomous driving vehicles travel a path according to an exemplary embodiment.
Figure 7B:
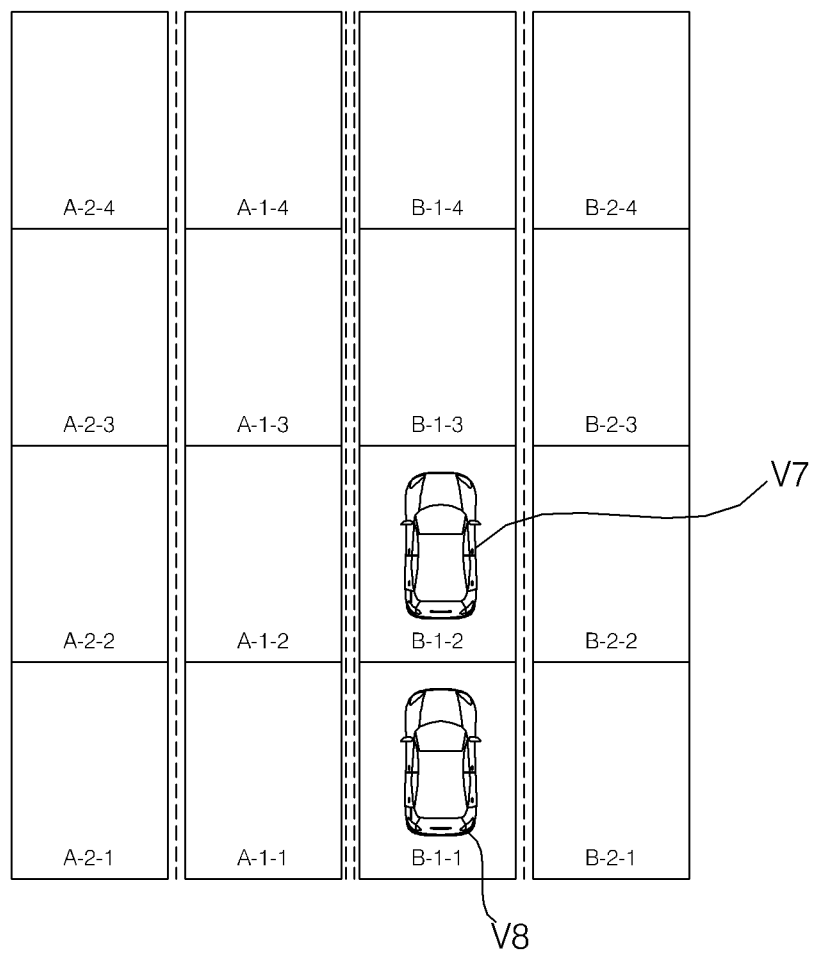

FIGS. 7A and 7B are another example in which a plurality of autonomous driving vehicles travels a path according to the exemplary embodiment.

Referring to FIG. 7A, a seventh vehicle V7 and an eighth vehicle V8 are travelling a section [B-1-1] and a section [B-2-1] respectively.

In this case, it is assumed that the seventh vehicle V7 and the eighth vehicle V8 simultaneously transmit occupation right setting requests for the section [B-1-2] to the management apparatus 100 in order to travel the first lane [B-1-X] among the up-line lanes, and the seventh vehicle V7 and the eighth vehicle V8 are travelling on different sections respectively, but they have the same conditions.

The management apparatus 100 may calculate or obtain a distance from each of the section [B-1-1] and the section [B-2-1] to the section [B-1-2]. For example, the controller 130 may extract a point corresponding to a section ID in the electronic map stored in the storage unit 120 and calculate or obtain a distance between two or more sections.

The section [B-1-1] is closer to the section [B-1-2] than the section [B-2-1], so that the controller 130 may approve the occupation right setting request of the seventh vehicle V7 and reject the occupation right setting request of the eighth vehicle V8.

In this case, the controller 130 may approve an occupation right for another section different from the section [B-1-2] to the eighth vehicle V8. For example, even though the eighth vehicle V8 does not transmit the occupation right setting request for the section [B-1-1], the controller 130 may automatically approve the occupation right for the section [B-1-1] and enable the eighth vehicle V8 to travel without unnecessarily stopping.

Accordingly, as illustrated in FIG. 7B, the seventh vehicle V7 travels from the section [B-1-1] to the section [B-1-2], and the eighth vehicle V8 travels the section [B-1-1], of which the occupation right is cancelled as the seventh vehicle V7 moves to the section [B-1-2] so the eighth vehicle V8 joins the first up-line lane [B-1-X].

Figure 8A:
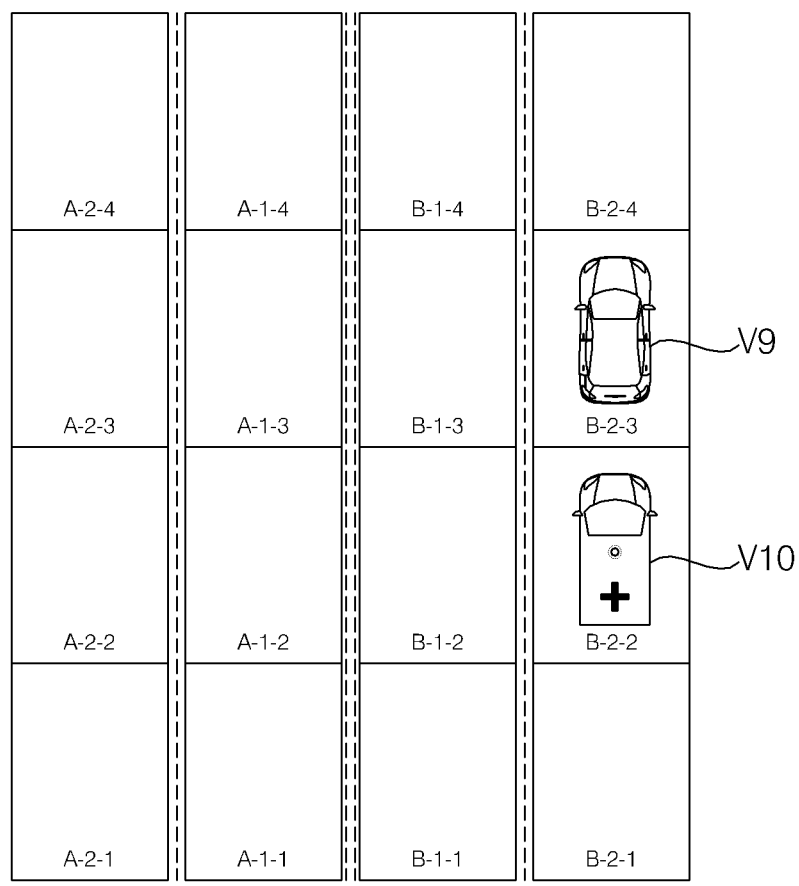
FIGS. 8A and 8B are an example in which a plurality of autonomous driving vehicles having different ratings travel a path according to another exemplary embodiment.
Figure 8B:
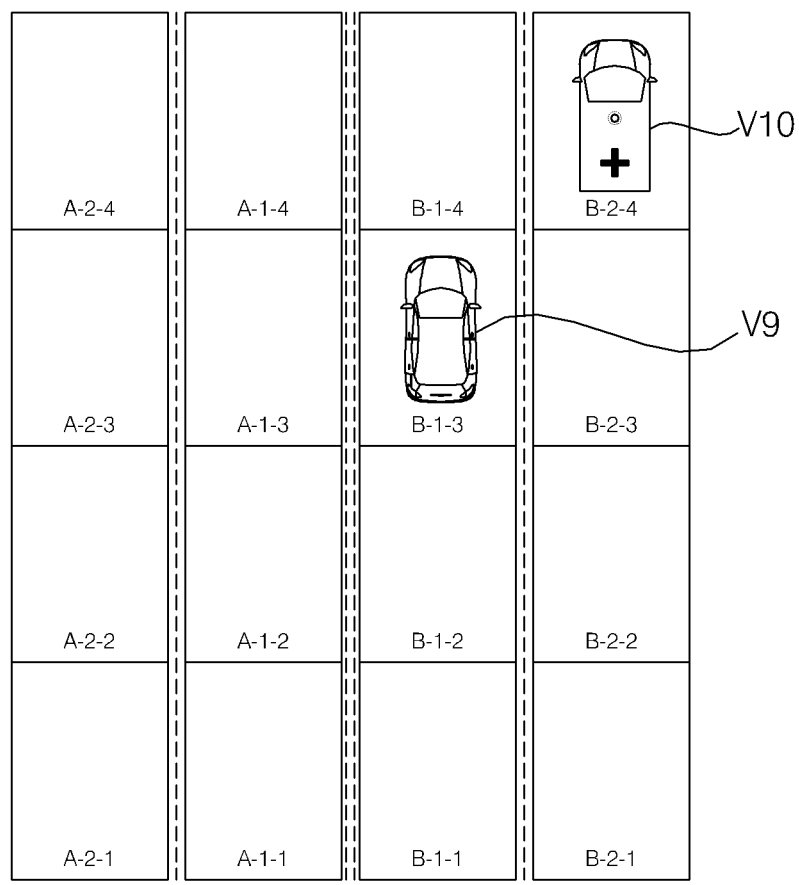

FIGS. 8A and 8B are an example in which a plurality of autonomous driving vehicles having different ratings travels a path according to another exemplary embodiment.

Referring to FIG. 8A, a ninth vehicle V9 and a tenth vehicle V10 are travelling a section [B-2-3] and a section [B-2-2], respectively.

In this case, it is assumed that the ninth vehicle V9 is a general four-wheeled vehicle, the tenth vehicle V10 is an ambulance, and a rating of the ambulance is set to be higher than ratings of other vehicles and stored in the storage unit 120, and the ninth vehicle V9 transmits an occupation right setting request for a section [B-2-4], and the tenth vehicle V10 transmits an occupation right setting request for sections [B-2-3] and [B-2-4].

The controller 130 may confirm that the ninth vehicle V9 is a general four-wheeled vehicle and the tenth vehicle V10 is an ambulance based on an ID of each vehicle included in the occupation right setting request.

In this case, when the ratings of the two vehicles transmitting the occupation right setting request for the same section are the same, the controller 130 may approve or reject the occupation right setting request of each vehicle based on a rule different from the rule for approving an occupation right to a vehicle closer to a section corresponding to the occupation right setting request or a vehicle first transmitting the occupation right setting request.

Particularly, when the ratings of the plurality of vehicles transmitting the occupation right setting requests for the same section are different, and the rating of the vehicle more distant from the section corresponding to the occupation right setting request is higher than the other vehicle, the controller 130 may approve the occupation right for the same section to the vehicle having the highest rating. Further, the controller 130 may compulsorily cancel the occupation right, which has been firstly approved to the vehicle having a low rating, and approve the compulsorily cancelled occupation right to the vehicle having the highest rating.

Referring back to FIG. 8A, the controller 130 may reject the occupation right setting request for the section [B-2-4] of the ninth vehicle V9, and compulsorily cancel the occupation right of the ninth vehicle V9 for the section [B-2-3] which has been already approved to the ninth vehicle V9. Accordingly, the controller 130 may approve the occupation right setting request for the sections [B-2-3] and [B-2-4] of the tenth vehicle V10. In this case, the controller 130 may compulsorily cancel the occupation right of the ninth vehicle V9 for the section [B-2-3], which has been approved to the ninth vehicle V9, and approve an occupation right for a section [B-1-3] to the ninth vehicle V9.

Accordingly, referring to FIG. 8B, the ninth vehicle V9 may travel from the section [B-2-3] to the section [B-1-3], and the tenth vehicle V10 may straightly travel from the section [B-2-2] to the section [B-2-4] via the section [B-2-3].

Figure 9A:
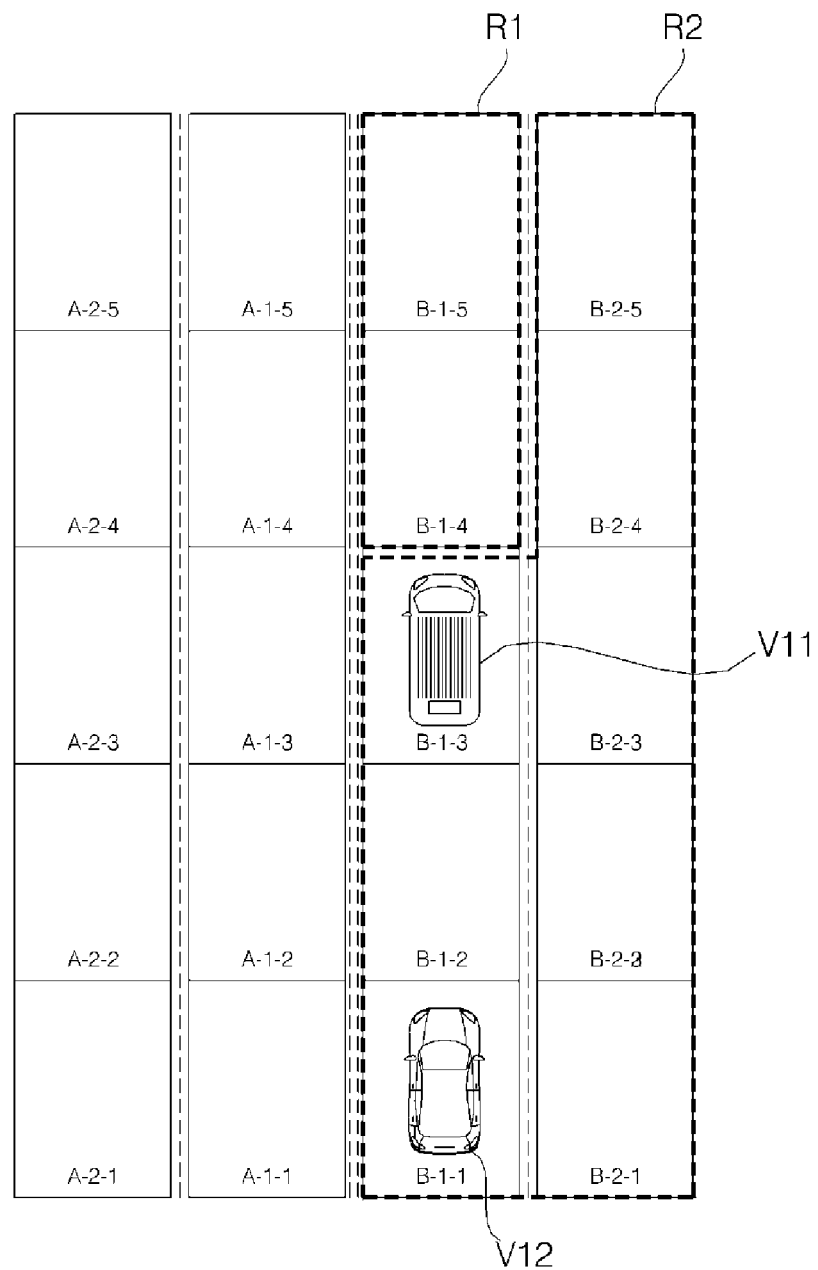
FIGS. 9A to 9C are an example in which a plurality of autonomous driving vehicles having different ratings travel a path including sections having different ratings according to yet another exemplary embodiment.
Figure 9B:
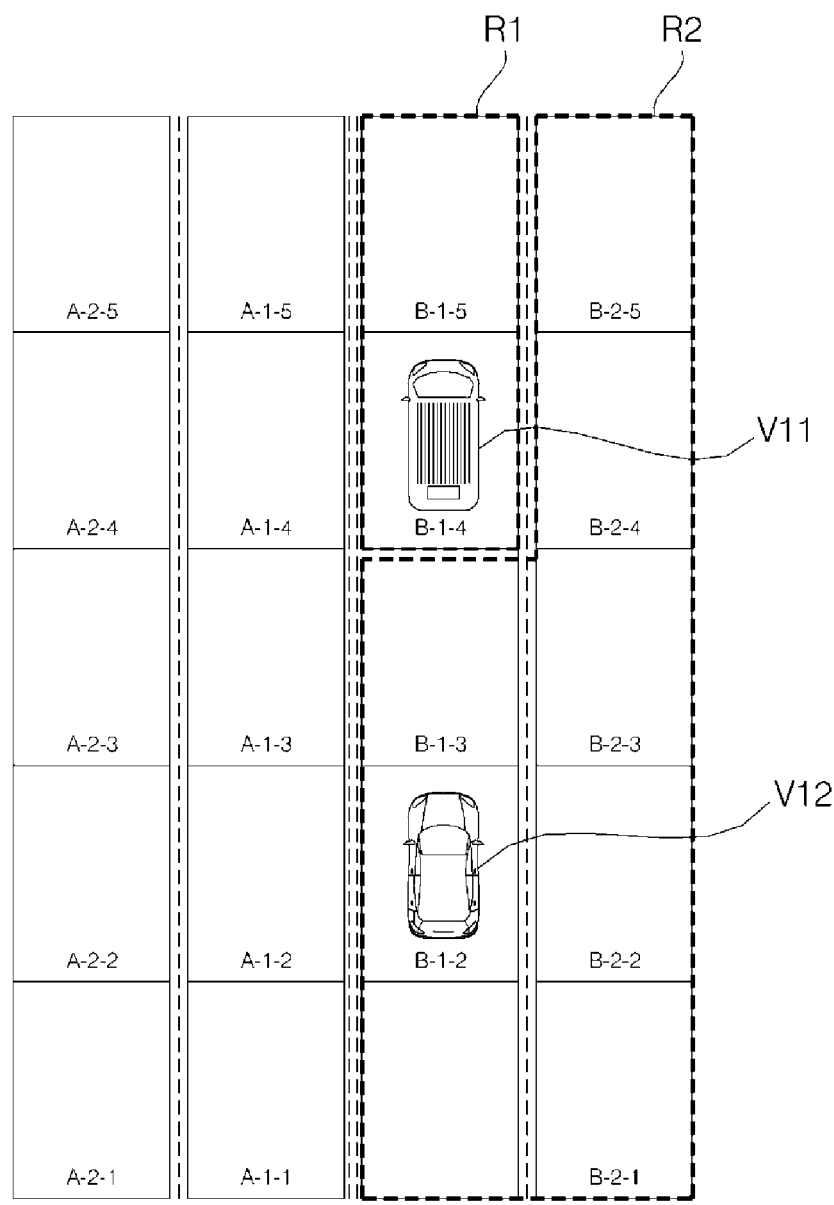
Figure 9C:
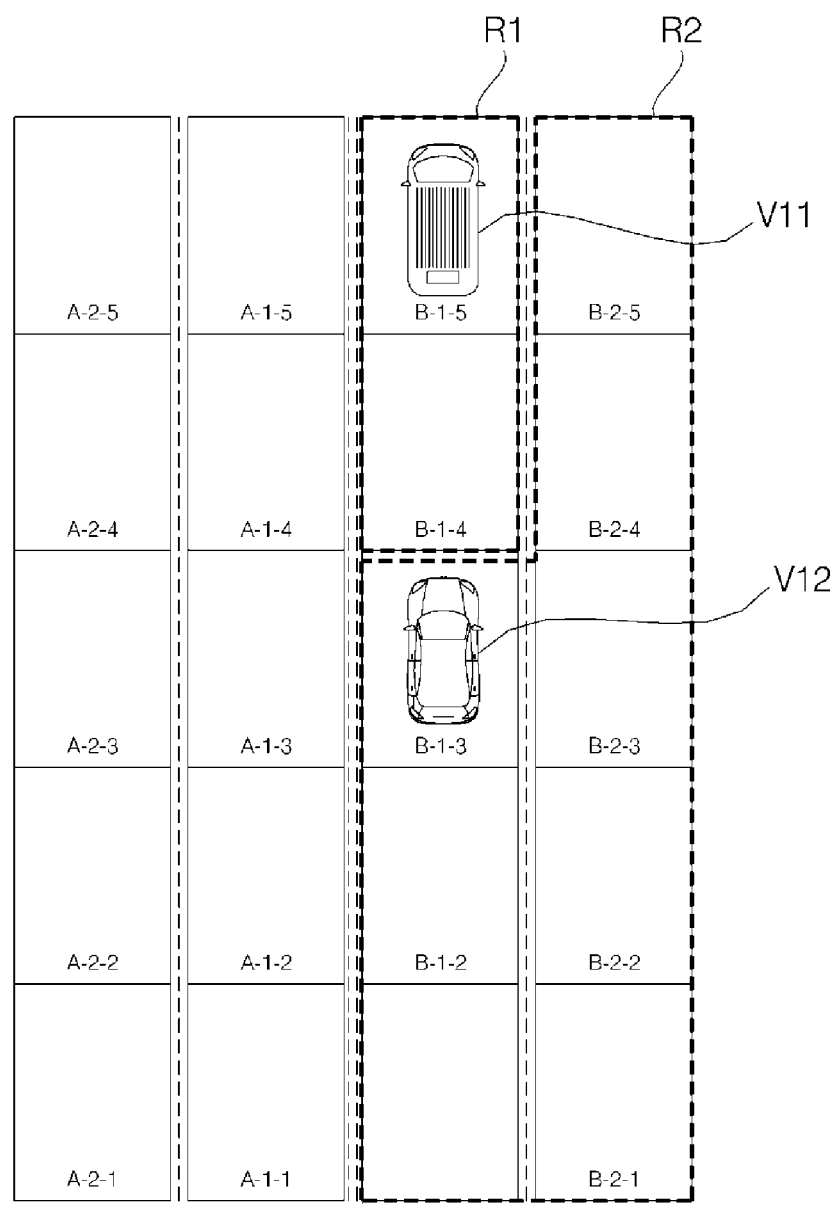

FIGS. 9A to 9C are an example in which a plurality of autonomous driving vehicles having different ratings travels a path including sections having different ratings according to yet another exemplary embodiment of the present invention.

Referring to FIG. 9A, an eleventh vehicle V11 and a twelfth vehicle V12 are travelling a section [B-1-3] and a section [B-1-1] respectively.

It is assumed that sections [B-1-4] and [B-1-5], which are exclusive bus lanes, are stored with a first rating R1 in the storage unit 120, and sections [B-1-1], [B-1-2], [B-1-3], [B-2-1], [B-2-2], [B-2-3], [B-2-4], and [B-2-5], which are general lanes, are stored with a second rating R2 in the storage unit 120.

It is assumed that a rule for approving a occupation right for the section of the first rating R1 to only a bus, and approving an occupation right for the section of the second rating R2 to all of the vehicles is pre-defined in the storage unit 120 or the controller 130.

Otherwise, a rule for allowing a bus to receive an approval of an occupation right regardless of a rating of a section, and allowing other vehicles to receive an approval of an occupation right for a section having a lower rating than that of the exclusive bus lane may be pre-defined in the storage unit 120 or the controller 130.

In the travelling situation illustrated in FIG. 9A, the eleventh vehicle V11 may transmit an occupation right setting request for the sections [B-1-4] and [B-1-5] having the first rating, and the twelfth vehicle V12 may transmit an occupation right setting request for the sections [B-1-2] and [B-1-3] having the second rating and the section [B-1-4] having the first rating.

In this case, if the eleventh vehicle V11 is the bus, the controller 130 may approve the occupation right for the sections [B-1-4] and [B-1-5] having the first rating to the eleventh vehicle V11. By contrast, if the twelfth vehicle V12 is the general four-wheeled vehicle which is not allowed to travel the section of the first rating, the controller 130 may approve the occupation right only for the sections [B-1-2] and [B-1-3] having the second rating to the twelfth vehicle V12, and reject the occupation right setting request for the section [B-1-4] having the first rating.

Accordingly, referring to FIG. 9B, the eleventh vehicle V11 may travel from the section [B-1-3] having the second rating to the section [B-1-4] having the first rating, and the twelfth vehicle V12 may travel from the section [B-1-1] to the section [B-1-2].

Next, referring to FIG. 9C, the eleventh vehicle V11 may travel to the section [B-1-5] via the section [B-1-4], but the twelfth vehicle V12 may not enter the section [B-1-4] having the first rating and travel only to the section [B-1-3] having the second rating.

That is, the plurality of ratings may be graded and assigned to the plurality of sections included in the electronic map, respectively so as to prevent a predetermined type of vehicle from entering, so that it is possible to prevent a situation causing an accident or traffic congestion due to entrance of the general four-wheel vehicle to the exclusive bus lane or entrance of a two-wheel vehicle to the expressway.

In the meantime, although not illustrated in the drawings, the controller 130 may not approve an occupation right for one or more sections right adjacent to a section, for which an occupation right is approved to a predetermined vehicle 1, to other vehicles. Accordingly, the controller 130 may secure one or more empty sections that are positioned between the vehicles, so that it is possible to decrease a possibility for collision between the vehicles.

According to the exemplary embodiments of the present invention, it is possible to provide the autonomous driving vehicle, the autonomous driving management apparatus, and the method of controlling the same, which may supplement a sensor measuring a travelling environment. That is, even though the sensor has a problem or degradation of detection function, it is possible to secure safety of a predetermined level or more.

According to the exemplary embodiments of the present invention, a vehicle may travel a path while sequentially requesting and receiving an approval of an exclusive occupation right for a specific region for a predetermined time, so that it is possible to maintain a distance from another vehicle and prevent a collision accident.

According to the exemplary embodiments of the present invention, an occupation right may be requested and approved only for a time corresponding to a travelling speed, so that it is possible to prevent a situation in which an occupation right is approved for an excessively long or short time. For example, when a travelling speed is relatively slow, an occupation right to exclusively occupy a specific region for a longer time may be approved.

According to the exemplary embodiments of the present invention, when a vehicle completes the travelling of a region for which an occupation right is approved, the vehicle may request a cancellation of the occupation right to enable another vehicle to receive an approval of the occupation right for the region of which the cancellation is requested. Accordingly, it is possible to make traffic flow more smoothly.

The above-mentioned exemplary embodiments of the present invention are not embodied only by an apparatus and a method. Alternatively, the above-mentioned exemplary embodiments may be embodied by a program executing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An autonomous driving vehicle, comprising:
   a wireless communication unit configured to receive position information about the vehicle;
   a storage unit configured to store an electronic map;
   an input unit configured to receive a destination;
   a driving unit configured to adjust a travelling speed and a travelling direction; and
   a controller configured to search for a path from a point corresponding to the position information to a point corresponding to the destination in the electronic map, and control the vehicle to travel an approved section by the driving unit when receiving an approval of an occupation right for one or more sections included in the path through the wireless communication unit;
   wherein the controller is configured to transmit an occupation right setting request for the one or more sections, and control the vehicle to travel the approved section by the driving unit when receiving a response to approve the occupation right setting request;
   wherein the occupation right setting request may include at least one of an identification of the vehicle, an identification of one or more sections for which the occupation right is desired to be approved, a transmission time of the right setting request, and a length of time for which the occupation right is desired to be approved; and
   wherein the controller is configured to adjust the length of time for which the occupation right is desired to be approved in accordance with the traveling speed of the vehicle.

2. The autonomous driving vehicle of claim 1, further comprising a sensor unit configured to measure a travelling environment.

3. The autonomous driving vehicle of claim 2, wherein the controller is configured to control the vehicle to travel the approved section by referring to information measured by the sensor unit.

4. The autonomous driving vehicle of claim 1, wherein when the vehicle completes the travelling of the approved section, the controller transmits an occupation right cancellation request for the approved section through the wireless communication unit.

5. The autonomous driving vehicle of claim 1, wherein the storage unit is configured to store the electronic map comprising a plurality of sections including different identifications.

6. An autonomous driving management apparatus, comprising:
   a storage unit configured to store an electronic map comprising a plurality of sections indcluding different identifications;
   a wireless communication unit configured to receive from a vehicle an occupation right setting request for one or more of the sections;
   a controller configured to obtain an identification of a section corresponding to the occupation right setting request, and approve or reject the occupation right setting request for the section having the identification of the section based on a pre-defined rule;
   wherin the storage unit is configured to further store at least on of a rating for each vehicle and a rating for each section; and
   wherein when an occupation right for the section corresponding to the occupation right setting request is set by another vehicle, the controller compares a rating between the vehicle and another vehicle, and when the rating of the vehicle is higher than the rating of another vehicle, the controller compulsorily cancels the occupation right for the section approved to another vehicle and approves the occupation right setting request.

7. The autonomous driving management apparatus of claim 6, wherein the controller is configured to transmit a response to approve or reject the occupation right setting request to the vehicle through the wireless communication unit.

8. The autonomous driving management apparatus of claim 6, wherein when an occupation right cancellation request is received from the vehicle through the wireless communication unit, the controller cancels an occupation right which has been approved for a section corresponding to the occupation right cancellation request.

9. The autonomous driving management apparatus of claim 6, wherein when the section corresponding to the occupation right setting request is a section for which the occupation right is approved to another vehicle, the controller rejects the occupation right setting request or approve an occupation right for one or more sections different from the section corresponding to the occupation right setting request.

10. The autonomous driving management apparatus of claim 6, wherein when occupation right setting requests for the same section are received from a plurality of vehicles, the controller approves the occupation right setting request for a vehicle having the highest rating amonlg the plurality of vehicles.

11. The autonomous driving management apparatus of claim 10, wherein the controller approves the occupation right setting request for a vehicle closest to the same section when the ratings of the plurality of vehicles are the same.

12. The autonomous driving management apparatus of claim 10, wherein the controller approves the occupation right setting request for a vehicle first transmitting the occupation right setting request among the plurality of vehicles when the ratings of the plurality of vehicles are the same.

13. The autonomous driving management apparatus of claim 6, wherein the controller approves the occupation right for one or more sections different from the section, for which the occupation right is compulsorily cancelled, to another vehicle.

14. The autonomous driving management apparatus of claim 6, wherein the controller is configured to determine whether a rating of the vehicle is a rating which is capable of traveling the section corresponding to the occupation right setting request based on the rating for each vehicle and the rating for each section, and when it is determined that the rating of the vehicle is the rating which is incapable of traveling the section corresponding to the occupation right setting request, the controller rejects the occupation right setting request or approves an occupation right for one or more sections different from the section corresponding to the occupation right setting request.

15. The autonomous driving management apparatus of claim 6, wherein the controller is configured to secure one or more empty sections that are positioned between the vehicles.

* * * * *